Patented June 19, 1951

2,557,473

UNITED STATES PATENT OFFICE 2,557,473

DRILLING FLUIDS AND METHODS OF USING SAME

Martin A. Ryan, Bartlesville, Okla., assignor to Phillips Petroleum Company, a corporation of Delaware No Drawing. Application October 14, 1947, Serial No. 779,834

12 Claims. (Cl. 252—8.5)

1

This invention relates to improved water base drilling muds. In one specific aspect it relates to drilling muds having a reduced water loss. In another specific aspect it relates to drilling muds having a reduced viscosity. In another specific aspect it relates to drilling muds containing water soluble salts of oxystarch or oxyinulin.

This application is a continuation-in-part of my copending application Serial No. 769,309, filed August 18, 1947, for "Drilling Muds and Methods of Use."

By water soluble salts of oxystarch, I mean to include the water soluble alkali metal salts (especially sodium, potassium and lithium), the water soluble alkaline earth metal salts (especially magnesium, calcium, barium and strontium), and other water soluble metal salts, as well as the water soluble ammonium salt and the water soluble salts of strong organic bases (such as triethanolamine, ethylenediamine, morpholine, and piperidine) of oxystarch (which is partly anhydroglucoronic acid and may be made by oxidation of starch with nitrogen dioxide, $NO_2$). By water soluble salts of oxyinulin, I mean the same group of compounds enumerated in the last sentence with inulin in place of starch.

Starch is assumed to be composed of a number "$n$" of units of d-glucose residues, each residue having the quantitative formulae $C_6H_{10}O_5$. The following structure has been deduced for starch:

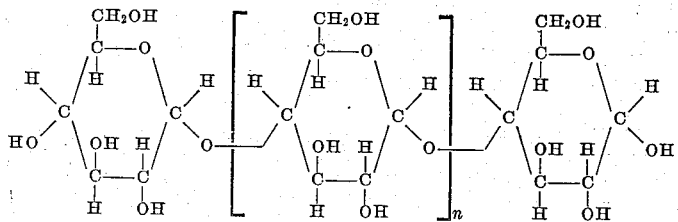

Each d-glucose unit has three hydroxyl groups (except the end units which have four). When nitrogen dioxide (or its dimer, $N_2O_4$) is brought into contact with such a glucose unit under proper conditions, the oxidation of the (—$CH_2OH$)

group to a carboxyl (COOH) group is effected with a very little or no dextrinization of the starch molecule or oxidation at the secondary hydroxyl groups or at the glucosidic linkages. Complete oxidation produces an almost undegraded oxidized starch molecule compound of polyanhydroglucuronic acid. The formation of syrup-like open chain sugar acids, which will ferment easily and change viscosity greatly on ag-

2 ing, is thus avoided. Oxystarch made as outlined by me above will not ferment under the conditions of use in well drilling and is substantially uniform in viscosity on aging.

The most preferred specific embodiments of my invention comprise the use of any of the above enumerated water soluble oxystarch compounds in (A) a water base well drilling mud comprising sufficient suspended solid materials to form a filter cake; and in (B) an oil in water emulsion well drilling mud in which the emulsion is stabilized by the selected water soluble oxystarch compound.

Among the highly preferred water soluble oxystarch compounds are the free acid oxystarch, the alkali metal, alkaline earth metal and ammonium oxystarches; and the same groups for oxyinulin.

Difficulties have been experienced in the prior art in trying to produce a low water loss drilling mud which will not have too high a viscosity and which will not ferment or need large amounts of costly treating chemicals.

In the art of drilling wells, especially drilling by the rotary method, it is necessary to use a drilling mud, as is well understood in the art. The drilling mud lubricates the drill stem, carries the cuttings to the surface of the well, and forms a filter cake on the walls of the well, preventing the loss of at least any substantial amount of water from the drilling mud to the natural formations in the well. The weight of the mud prevents blowouts of formation pressures especially when weighting agents are employed. In order to perform these important functions properly the drilling mud must have suitable viscosity and other qualities at all times in spite of adverse conditions encountered in drilling the well. Thixotropic properties of the mud support the cutting during any time the pumps are shut down.

In drilling wells there are two major difficulties caused by natural formations penetrated. The first of these difficulties is that if salt is encountered the salt will cut ordinary drilling mud so that its vicsosity is entirely too high, the clay particles are flocculated, and there is grave danger of the drilling pipe twisting in half or gas cutting or a blowout occurring due to the salt cutting of the mud. The other difficulty encountered is that when a formation known as heaving shale is penetrated, this heaving shale absorbs water from the drilling mud and by a caving or disintegrating action common to clay and shale, or by a swelling action common to bentonite materials, the well hole is closed around the drill string choking off the circulation of drilling mud and often seizing the drill string so that the drill string twists in half.

One object of my invention is to produce a drilling mud which can be used not only in ordinary formations but which will resist contamination by salt and which will not cause heaving shale or similar formations to cave or swell.

Another object is to provide an improved drill-in mud.

Another object is to provide an improved method of drilling.

Another object is to provide a method of drilling suitable in ordinary formations, in salt containing formations and in formations tending to cave or heave.

Another object is to produce a drilling mud with low viscosity, and low initial gel strength and relatively high gel strength after being undisturbed for 10 minutes.

Another object is to provide a new drilling mud additive.

Another object is to provide a method for the production of my new drilling mud additive.

Numerous other objects and advantages of the invention will be apparent to those skilled in the art upon reading the following specification and the accompanying claims.

OPERATION

In the present invention I prefer to employ as a colloidal suspending agent or dispersing agent in a drilling mud a water soluble oxystarch or oxyinulin compound selected from the group consisting of water soluble free acid and the water soluble alkali metal, alkaline earth metal and the ammonium and organic base salts of oxystarch and oxyinulin wherein the important salts of the alkali metals are lithium, sodium and potassium and the alkaline earth metals are magnesium, calcium, strontium and barium.

In order to obtain the desired improvements of the various desirable characteristics mentioned, I use from one to 10 pounds per barrel (42 gallon barrel), depending somewhat on the type drilling mud employed as will be clearly shown in the examples given in the specification.

The manner in which these above mentioned water soluble starch and inulin compounds are made is immaterial to the present invention provided a water soluble substantially non-degraded material is produced which will not ferment or change viscosity quickly as would degraded open chain syrup-like sugar acids. In this respect, the reaction to finally produce the water soluble material may be carried out in the mud pit, or even in the bore of the well being drilled, as for example oxystarch, which is an acid, may be added to the drilling mud in the pit or elsewhere, and sufficient alkali, such as ammonium hydroxide, added to make the desired water soluble salt of oxystarch. The same is true of the formation of the other water soluble oxystarches and oxyinulins. It is preferable however to make the complete water soluble oxystarch or oxyinulin elsewhere and to add the finished product to the mud.

My preferred method of making oxystarch or oxyinulin is to take a portion of a commercially pure but inexpensive grade of starch or inulin and mechanically disperse the same in a non-polar solvent such as n-pentane or chloroform in a reactor equipped with an agitator. The reactor is provided with suitable means for introducing dry nitrogen dioxide gas of the formula $NO_2$ into the dispersion, means of passing the vapors into a reflux condenser, condensing the $NO_2$ vapor while allowing the resulting nitric oxide (NO) to pass through the condenser to the outside, passing the condensed $NO_2$ through a drying medium and allowing the dry $NO_2$ to re-enter the reactor. The temperature of the reaction mixture is maintained below 21.3° C. which is the temperature at which $NO_2$ decomposes. (Whenever $NO_2$ is mentioned above and elsewhere, obviously it includes $N_2O_4$ which is generally also present.)

The usual types of oxidation catalysts may be used in the reaction, but I prefer not to employ them unless care is exercised in preventing undue degradation.

After the reaction has proceeded to the desired degree of oxidation, the reaction product is removed and purified by dissolving and reprecipitating in a suitable polar solvent to remove $NO_2$ or other uncombined materials.

By the practice of this process of manufacture, an oxidized starch or oxidized inulin is produced with only a minor degree of degradation or dextrinization.

The calculated maximum carboxyl content when all of the primary hydroxyl groups have been oxidized is 25.6%. The oxidation may be discontinued at any stage to yield a starch or inulin with a lower carboxyl content. However, as the carboxyl content increases, the starch or inulin molecule becomes more readily soluble in water. In actual practice, it is preferable to use a starch or inulin having a carboxyl content in the range of 12% to 20%. These oxystarches and inulins are readily soluble in water and the cost of producing them is not as great as for higher carboxyl content starches and inulins respectively. However, starches and inulins of lower carboxyl content may be employed as long as they are water soluble.

The preferred limit of 12% represents a lower limit at which insoluble gels become troublesome in the drilling mud (see Table I) and the upper limit of 20% is substantially the economic limit of relatively inexpensive substitution.

The water soluble oxystarches and oxyinulins may be in dried powder form, the particle size not being critical. However, for rapid solution a particle size where 90% will pass a 15 mesh screen is useful. In the case of some slowly water soluble oxystarches and oxyinulins, or to speed up the solution of any water soluble oxystarch or oxyinulin, any suitable solubilizing agent may be added first, such as alcohol, or alkaline solutions, to form a concentrated solution or paste, and then the said concentrated solution or paste diluted with water and/or the drilling mud, and the diluted mixture added to the drilling mud in the mud pit or at the pump intake.

In rotary drilling the usual methods consist in adding the water soluble oxystarch or oxyinulin powder (which may be added to the drilling fluid flowing in the mud ditch to the pump intake, or to the mud pit) by scattering the powder over the surface of the drilling mud. An alternative method would be to make up a more or less concentrated solution of the water soluble oxystarch or oxyinulin and add that in a stream to the drilling mud. The drilling fluid containing the water soluble oxystarch or oxyinulin and/or other suspended solids such as calcium carbonate or barium sulfate and water is pumped and circulated or reverse circulated in the drill string and well or used to fill or partially fill the well in the usual operations of well drilling and well controlling of the prior art. When these water soluble oxystarches and oxyinulins are so used in sufficient amounts, a new result is achieved in that salt water does not cut the mud qualities enough to ruin it for drilling and caving or heaving of formations exposed to it is reduced. Suitable control or mud treating agents may be used, such as phosphates and/or alkalis such as caustic soda or lime and/or quebracho if desired, for control of viscosity although in most instances no further control of viscosity or other mud characteristics is necessary after my oxystarch or oxyinulin is added to the drilling mud.

The mode or theory of operation by which these water soluble oxyinulins and oxystarches protect the surface of clay or bentonite from attack by water is obscure, but it is believed that as the water attempts to enter the clay they form a layer of a protective material on the outside of the clay or bentonite preventing the clay or bentonite from absorbing the water from the drilling mud.

Drilling muds containing water soluble oxystarches and oxyinulins selected from the group enumerated above are not subject to injury by salt to any detrimental degree but may still be useful as drilling muds when there is as much, in some instances, as 238,000 parts per million of sodium chloride in the drilling mud or more. Such muds containing water soluble oxystarch or oxyinulin salts often have low initial gel strength which allows gas bubbles and cuttings to come out of the drilling mud when agitated rapidly so that the drilling mud will not become gas cut or full of cuttings. Elimination of gas cutting reduces the chances of blowouts. Yet the 10 minute gel strength is high and will support cuttings when the drilling and mud pumps stop so that they will not fall on and seize the bit so that it cannot be removed. Only the larger cuttings will fall all the way to the bit. Such drilling muds are often characterized by very thin filter cake thicknesses and by relatively small water loss. This is very useful in avoiding large losses of water to the formation, as well as the resultant swelling or caving of the formation which occurs with some formations. They do not generally ferment or spoil. Numerous other advantages of such drilling muds will be apparent from a study of the following representative experiments which have been selected to show in a minimum of space the advantages of water soluble oxystarches and oxyinulins selected from the above enumerated group.

TESTS

The tests of the properties of solutions of these water soluble oxystarches and/or oxyinulin drilling muds were all made with standard drilling mud laboratory equipment.

The measurements of pH were all made with a Beckman "Industrial Model M" pH meter. The viscosity measurements were all made with a Stormer viscosimeter 1931 model made by Arthur H. Thomas Company. The mixing of samples was always for 15 minutes with a Hamilton Beach No. 33 high speed mixer. Sodium chloride content was calculated from a determination of the chlorine ions by titration with silver nitrate using a potassium chromate indicator. The filter cake thickness and water losses were all determined with an "A. P. I. low pressure wall building tester filter press" with a pressure of 100 lbs. per square inch applied for 30 minutes. All temperatures were approximately room temperature. All barrels are 42 U. S. gallon barrels.

EXAMPLE A

The oxystarch used in these tests was made by the oxidation of a commercially pure starch with nitrogen dioxide as described below:

A charge of 500 grams of starch was dispersed in 500 grams of n-pentane and placed in a three-necked flask equipped with an agitator. Dry nitrogen dioxide ($NO_2$) was passed into the system. The $NO_2$ coming off was condensed in a reflux condenser, dried by passing over $P_2O_5$ in a trap and returned to the reaction chamber. The temperature of the condenser was maintained at such a level that the nitric oxide (NO) did not condense but passed out into the hood.

The reaction was stopped after 56 hours and the product washed several times with chloroform and dried in a vacuum oven. Analysis by the calcium acetate method indicated a 12.6% carboxyl content.

The product was then dispersed in chloroform and treated with $NO_2$ for an additional 40 hours. It was then purified by dissolving in 10% sodium hydroxide solution, neutralizing with 3 N hydrochloric acid and reprecipitating with methanol. Analysis of the product with the Beckman pH meter indicated a carboxyl content of 24.2%.

Another batch was made with a shorter oxidation period. The carboxyl content of this batch was 11% carboxyl content.

Similar results are obtained with inulin.

EXAMPLE B

One per cent solutions of the two samples of oxystarch prepared in "A" were prepared and allowed to stand overnight. Tests were run and the following results obtained:

*Table I*

|  | ml. gel 10 ml. solution | pH | Viscosity at 24° C. |
|---|---|---|---|
| Oxystarch 11% | 0.35 | 3.4 | 1.0 |
| Oxystarch 24% | trace | 5.25 | 1.0 |

The data tabulated under "ml. gel per 10 ml. solution" represent the amount of insoluble gel collected in the bottom of a centrifuge tube after centrifuging for five minutes.

Similar results are obtained with oxyinulin.

EXAMPLE C

For the evaluation of the two oxystarch samples, dosages equivalent to 0, 1, 2, 3, 4, 6 and 10 pounds of material per barrel of mud were tested. Weighed portions of the oxystarch samples were hydrated overnight in 50 ml. of water and each hydrated aqueous sample added to 250 ml. of base mud, which had the following composition after dilution: Ezmix (a native Texas clay) 8.1%, bentonite 0.8%, $BaCO_3$ 0.8%, $BaSO_4$ 26.3% and water 64.0%.

The treated muds were stirred for 30 minutes on a high speed mixer and then tested according to the procedures outlined in API Code #29. The results are shown in Tables II and III.

Table II
OXYSTARCH (OF 11% BY WEIGHT CARBOXYL CONTENT)

| Pounds per barrel | 0 | 1 | 2 | 3 | 4 | 6 | 10 |
|---|---|---|---|---|---|---|---|
| Viscosity, cps | 16.5 | 16 | 9.5 | 11.5 | 8.5 | 11 | 11 |
| Initial Gel Strength, g | 29 | 8 | 6 | 0 | 0 | 4 | 11 |
| 10 min. gel strength, g | 50 | 15 | 15 | 10 | 10 | 10 | 20 |
| Water loss, ml. in 30 min | 29 | 24 | 24 | 23 | 22 | 22 | 20 |
| pH of filtrate | 9.0 | 8.0 | 8.0 | 7.7 | 7.6 | 8.2 | 8.2 |

Table III
OXYSTARCH (OF 24% BY WEIGHT CARBOXYL CONTENT)

| Pounds per barrel | 0 | 1 | 2 | 3 | 4 | 6 | 10 |
|---|---|---|---|---|---|---|---|
| Viscosity, cps | 16.5 | 13 | 8 | 6 | 10 | 10 | 6 |
| Initial Gel Strength, g | 29 | 4 | 2 | 2 | 2 | 2 | 1 |
| 10 Min. Gel Strength, g | 50 | 10 | 10 | 10 | 10 | 10 | 5 |
| Water Loss | 29 | 28.5 | 27 | 27 | 28.5 | 25 | 26 |
| pH of filtrate | 9.0 | 8.5 | 7.9 | 7.9 | 7.9 | 8.0 | 7.9 |

Similar effects are to be obtained with the alkali metal, the alkaline earth metal, the ammonium and the organic base salts of oxystarch and oxyinulin.

EXAMPLE D

Similar dosages of additive were tested with samples of the same mud as used in "C" except that the water phase was 50% saturated with sodium chloride. The results were as shown in Tables IV and V.

Table IV
OXYSTARCH (11% BY WEIGHT CARBOXYL CONTENT) IN WATER MUD

| Pounds per barrel | 0 | 2 | 4 | 10 |
|---|---|---|---|---|
| Viscosity, cps | 29 | 36.5 | 27 | 22 |
| Initial Gel Strength, g | 50 | 30 | 20 | 15 |
| 10 Min. Gel Strength, g | 70 | 60 | 55 | 45 |
| Water Loss | 56.5 | 50.5 | 49 | 45 |
| pH of filtrate | 8.2 | 7.9 | 7.8 | 8.1 |

Table V
OXYSTARCH (24% BY WEIGHT CARBOXYL CONTENT) IN SALT WATER MUD

| Pounds per barrel | 0 | 2 | 4 | 10 |
|---|---|---|---|---|
| Viscosity, cps | 29 | 30 | 26.5 | 24.5 |
| Initial Gel Strength, g | 50 | 27 | 26 | 20 |
| 10 Min. Gel Strength, g | 70 | 30 | 35 | 35 |
| Water Loss | 56.5 | 51.5 | 51 | 52 |
| pH of filtrate | 8.2 | 7.8 | 8.0 | 8.1 |

Similar effects in drilling mud are obtained with the alkali metal, the alkaline earth metal, the ammonium and the organic base salts of oxystarch and oxyinulin.

EXAMPLE E

The treating effects of the raw starch from which the oxystarch was made were tested on a sample of the mud used in Example A. The raw starch was insoluble but for the tests, the desired dosages were mechanically dispersed in the mud. The results were as follows in Table VI:

Table VI
POTATO STARCH (RAW)

| Pounds per barrel | 0 | 4 |
|---|---|---|
| Viscosity, cps | 16.5 | 16 |
| Initial Gel Strength, g | 29 | 29 |
| 10 Min. Gel Strength, g | 50 | 40 |
| Water Loss | 29 | 29.5 |
| pH of filtrate | 9.0 | 9.2 |

EXAMPLE F

The following advantages of drilling mud containing water soluble oxystarches will be found to be true:

(1) Such drilling mud is made resistant as to change in important qualities, such as viscosity, gel strength and low water loss, to salt or anhydrite formations.

(2) Excellent logs can be obtained by all types of electrical bore hole tests, such as the "Electrolog" (a trade name) test when the hole is full of such drilling mud.

(3) Large savings in weighting agents.

(4) Large savings in treating agents.

(5) When using such muds generally, any intermediate strings of casings to protect the well from rock salt or bentonitic shale will be unnecessary, and their cost can be saved.

(6) The filter cake of such muds is thin, strong, impervious and has low water loss compared to ordinary mud.

(7) These muds will last longer in the drilling mud pit and well bore than most other known organic additives, withstanding chemical and bacterial action and retaining their valuable treating properties.

(8) Because the sides of the hole do not tend to dissolve or cave, such mud hole enlargement during and after drilling is kept at a minimum and many advantages result. A broken drill string cannot get under a ledge in case of a twist off. The amount of cement used in cementing around a casing is reduced and the cement tends to go around the entire casing and not channel by at one point.

EXAMPLE G

Samples of starch containing drilling mud and samples of drilling mud containing water soluble oxystarches selected from the group consisting of free acid oxystarch and the water soluble alkali metal, alkaline earth metal and ammonium salts wherein the important alkali metals are lithium, sodium and potassium and the important alkaline earth metals are magnesium, calcium, strontium and barium are left to stand for 6 months. Some of each are contaminated with sour mud (fermented starch mud) others merely exposed to the air.

The starch containing muds will all ferment and go sour, becoming flocculated or otherwise worthless as drilling muds in a period of some days, the contaminated ones fermenting almost at once, the uncontaminated ones fermenting several days later. None of the water soluble oxystarches selected from the above enumerated group will ferment, even after six months, regardless of contamination and exposure to the air. It is possible some organism could attack them successfully, but they are much more resistant than starch containing muds.

EXAMPLE H

A solution of 4 pounds to the barrel of water soluble oxystarches selected from the above enumerated group is mixed with greater than the usual maximum proportions of caustic soda, lime, phosphates (commercially sold as "Calgon") and/or quebracho as used in starch drilling mud and no detrimental chemical changes are observed. The tests are made with both one or more of these chemicals added to the solution.

The above simple experiments are merely representative and are given to show how water soluble oxystarches selected from the above enumerated group may be used in water base drilling muds by those skilled in the art of water base drilling muds.

It is to be understood that while a theory of operation has been advanced, it is not the only or necessary one, but has only been advanced to facilitate the disclosure. It is understood, however, that this invention is not limited to any theory of operation or action. It is further obvious that various changes may be made in the details without departing from the spirit of this invention, or from the scope of the invention as defined in the following claims. It is to be understood that the invention is not to be limited to the specific details described. For example, the tests with treating and control agents under Example F indicate that water soluble oxystarches are somewhat inert chemically and that all the treating, weighting and control agents of the well drilling fluid and well controlling fluid arts may, after a simple test for lack of obvious adverse reaction, be employed without invention in such drilling muds and that with few, if any, exceptions they will be so employable. My invention is therefore to be defined by the following claims.

Having described my invention, I claim:

1. In a process for drilling a well through an earthen stratum with a well drilling tool wherein there is circulated in the well a water base drilling mud containing colloidal particles of clayey material suspended in sufficient water to render the same circulatable, the improved method for removing from said well earthen particles formed by said tools when penetrating said stratum and for forming a filter cake on the wall of said well to decrease the loss of fluid from said drilling mud contained therein into a surrounding earthen formation which comprises admixing with said drilling mud and interacting therewith a water soluble compound selected from the group consisting of water soluble oxystarch in which sufficient methylol groups have been converted to carboxyl groups so that the latter constitutes from 12 to 20 weight per cent of said oxystarch, oxyinulin in which sufficient methylol groups have been converted to carboxyl groups so that the latter constitutes from 12 to 20 weight per cent of said oxyinulin, the sodium, lithium, potassium, magnesium, calcium, barium, strontium, ammonium and organic base salts of said oxystarch and of said oxyinulin in an amount within the range of one to ten pounds of said compound per barrel of said mud and circulating the resulting drilling mud through said well in contact with the wall thereof to remove said cuttings and to form said filter cake thereon.

2. In a process for drilling a well through an earthen stratum with a well drilling tool wherein there is circulated in the well a water base drilling mud containing colloidal particles of clayey material suspended in sufficient water to render the same circulatable, the improved method for removing from said well earthen particles formed by said tools when penetrating said stratum and for forming a filter cake on the wall of said well to decrease the loss of fluid from said drilling mud contained therein into a surrounding earthen formation which comprises admixing with said drilling mud and interacting therewith a water soluble oxystarch in which sufficient methylol groups have been converted to carboxyl groups so that the latter constitutes from 12 to 20 weight per cent of said oxystarch, said oxystarch being employed in an amount within the range of one to ten pounds of said compound per barrel of said mud, and circulating the resulting drilling mud through said well in contact wtih the wall thereof to remove said cuttings and to form said filter cake thereon.

3. A water base well drilling mud comprising in combination sufficient water to maintain the mud as a fluid, sufficient clayey material to form a filter cake on the wall of the well, and a water soluble oxystarch or oxyinulin compound selected from the group consisting of water soluble oxystarch in which the methylol group has been converted to a carboxyl group, the oxyinulin in which the methylol group has been converted to a carboxyl group, the sodium, lithium and potassium, calcium, magnesium, barium and strontium and the ammonium and organic base salts of said oxystarch and said oxyinulin in an amount from one to ten pounds per barrel of mud.

4. A water base well drilling mud comprising in combination sufficient water to maintain the mud as a fluid, sufficient clayey material to form a filter cake on the wall of the well, and from one to ten pounds of a water soluble oxystarch in which the methylol group has been converted to a carboxyl group per barrel of mud.

5. A water base well drilling mud comprising an aqueous fluid mixture containing suspended solids which form a filter cake on the wall of the well, and a water soluble oxystarch or oxyinulin compound selected from the group consisting of water soluble oxystarch in which the methylol group has been converted to a carboxyl group, the oxyinulin in which the methylol group has been converted to a carboxyl group, sodium, lithium and potassium, magnesium, calcium, barium, strontium, and the ammonium salts and organic base salts of said oxystarch and said oxyinulin in an amount from one to ten pounds per barrel of mud.

6. A water base well drilling mud comprising an aqueous fluid mixture containing suspended solids which form a filter cake on the wall of the well, and from one to ten pounds of a water soluble free acid oxystarch per barrel of mud.

7. A water base well drilling mud comprising in combination sufficient water to maintain the mud as a fluid, sufficient clayey material to form a filter cake on the wall of the well and a water soluble oxystarch or oxyinulin compound selected from the group consisting of water soluble oxystarch, oxyinulin, the sodium, lithium, potassium, calcium, magnesium, barium, strontium, ammonium and organic base salts of said oxystarch and said oxyinulin in an amount of one to ten pounds per barrel of mud, which oxystarch and oxyinulin are a reaction product of starch and inulin, respectively, and nitrogen dioxide.

8. A water base well drilling mud comprising in combination sufficient water to maintain the mud as a fluid, sufficient clayey material to form a filter cake on the wall of the well and a water soluble oxystarch or oxyinulin compound selected from the group consisting of water soluble oxystarch, oxyinulin, the sodium, lithium, potassium, calcium, magnesium, barium, strontium, ammonium and organic base salts of said oxystarch and said oxyinulin in an amount of one to ten pounds per barrel of mud, which oxystarch and oxyinulin are a reaction product of starch and inulin, respectively, and nitrogen dioxide, said oxystarch and oxyinulin having a carboxyl content of between 12 and 20 weight per cent.

9. A water base well drilling mud comprising in combination sufficient water to maintain the mud as a fluid, sufficient clayey material to form a filter cake on the wall of the well, and a water soluble oxystarch in an amount from one to ten pounds per barrel of mud, which oxystarch has a carboxyl content between 12 and 20 weight per cent.

10. A water base well drilling mud comprising in combination sufficient water to maintain the mud as a fluid, sufficient clayey material to form a filter cake on the wall of the well, and a water soluble oxystarch in an amount from one to ten pounds per barrel of mud, which oxystarch is a reaction product of starch and nitrogen dioxide and has a carboxyl content between 12 and 20 weight per cent.

11. A water base well drilling mud comprising in combination sufficient water to maintain the mud as a fluid, sufficient clayey material to form a filter cake on the wall of the well, and a water soluble oxyinulin in an amount from one to ten pounds per barrel of mud, which oxyinulin has a carboxyl content between 12 and 20 weight per cent.

12. A water base well drilling mud comprising in combination sufficient water to maintain the mud as a fluid, sufficient clayey material to form a filter cake on the wall of the well, and a water soluble oxyinulin in an amount from one to ten pounds per barrel of mud, which oxyinulin is a reaction product of inulin and nitrogen dioxide and has a carboxyl content between 12 and 20 weight per cent.

MARTIN A. RYAN.

REFERENCES CITED

The following references are of record in the file of this patent:

UNITED STATES PATENTS

| Number | Name | Date |
|---|---|---|
| 2,316,128 | Bock et al. | Apr. 6, 1943 |
| 2,399,986 | Chapman | May 7, 1946 |
| 2,417,235 | Cannon | Mar. 11, 1947 |
| 2,417,307 | Larsen | Mar. 11, 1947 |
| 2,425,768 | Wagner | Aug. 19, 1947 |
| 2,468,792 | Wagner et al. | May 3, 1949 |

OTHER REFERENCES

Kerr: Chemistry and Industry of Starch, published 1944 by Academic Press of New York, pp. 224–239.

Mench et al.: The Nitrogen Dioxide Oxidation of Starch, article in Proceedings of the Indiana Academy of Science, vol. 55, 1946, pp. 69 to 76.